United States Patent [19]

Kishino

[11] 4,053,268

[45] Oct. 11, 1977

[54] APPARATUS FOR MOLDING A SLURRY OF CALCIUM SILICATE CRYSTALS

[75] Inventor: Junji Kishino, Gifu, Japan

[73] Assignee: Kabushiki Kaisha Osaka Packing Seizosho, Japan

[21] Appl. No.: 642,652

[22] Filed: Dec. 22, 1975

[30] Foreign Application Priority Data

Dec. 27, 1974 Japan .................................. 50-2661
Feb. 21, 1975 Japan .................................. 50-24716

[51] Int. Cl.² ............................................. B28B 3/04
[52] U.S. Cl. ................................. 425/84; 425/228; 425/232; 425/256; 425/422; 425/443; 425/449
[58] Field of Search ............... 425/84, 85, 87, 218, 425/422, 443, 455 R, 449, 89, 145, 228, 232, 226; 264/37, 86, 87, 333, 110, 128; 162/396, 399, 398, 407; 137/625.41

[56] References Cited

U.S. PATENT DOCUMENTS

| | | | |
|---|---|---|---|
| 3,127,307 | 3/1964 | Young | 162/396 |
| 3,503,412 | 3/1970 | Schuler | 137/625.41 |
| 3,534,439 | 10/1970 | Hass et al. | 425/422 |
| 3,697,631 | 10/1972 | Charman et al. | 425/84 |
| 3,736,159 | 5/1973 | Gibson et al. | 264/87 |
| 3,755,515 | 8/1973 | Cochardt | 264/87 |
| 3,823,742 | 7/1974 | Von Corpon | 137/625.41 |
| 3,908,862 | 9/1975 | Chandra et al. | 425/145 |

Primary Examiner—Francis S. Husar
Assistant Examiner—John McQuade
Attorney, Agent, or Firm—Larson, Taylor and Hinds

[57] ABSTRACT

An apparatus for molding a slurry of calcium silicate crystals comprising: a base plate provided with drain passages on the upper surface; a net conveyor having meshes for dewatering the slurry and disposed on the upper surface of the base plate in contact therewith; a frame-shaped lower mold placed on the net conveyor and immediately above the base plate; an upper mold provided on the low surface thereof with dewatering means for dewatering the slurry and movable into the lower mold to press and dewater the slurry in cooperation with the lower mold and to thereby form a shaped product; drive means for raising and lowering the lower mold; drive means for raising and lowering the upper mold; and lower mold holders movable with the upper mold and also movable upward and downward independently of the upper mold.

8 Claims, 15 Drawing Figures

APPARATUS FOR MOLDING A SLURRY OF CALCIUM SILICATE CRYSTALS

This invention relates to an apparatus for molding a slurry of calcium silicate crystals by dewatering the slurry, and more particularly to a molding apparatus by which materials consisting predominantly of such slurry can be dewatered and molded into panels or boards.

Throughout the specification and claims, the term "slurry of calcium silicate crystals" is used to mean a slurry which has the feature that when merely dried after dewatering and molding, it gives a shaped product having high mechanical strength.

Exemplary of such slurry is a slurry in which needle-like or plate-like crystals of calcium silicate have formed agglomerates by being irregularly threedimensionally interlocked with one another, with numerous crystals projecting outward therefrom in the form of beard, the agglomerates being void in the interior thereof and dispersed in water and having a diameter of 10 to 150 $\mu$. Such slurry of calcium silicate crystals is already disclosed in U.S. Pat. No. 3,679,446 and British Pat. No. 1,277,271 and 1,277,272.

A method for manufacturing said slurry, for example, comprises heating with stirring an aqueous slurry containing lime and a reactive siliceous material in a molar ratio of CaO : SiO$_2$ between 0.65 : 1 and 1.3 : 1 under a steam pressure of at least 5 kg/cm$^2$ gauge to produce crystallized calcium silicate hydrate dispersed in aqueous medium and to prevent the production of any hardened mass therein. Such method for manufacturing said slurry is described in U.S. Pat. No. 3,501,324 and British Pat. No. 1,193,172.

The slurry of calcium silicate crystals has the feature that when merely dried after dewatering and molding, it gives a shaped product having high mechanical strength. Accordingly, shaped products of calcium silicate can be formed from the slurry by simple equipment and procedure without subjecting the molded mass to steam treatment in an autoclave which treatment is usually required in preparing a shaped product from calcium silicate gels.

Whereas the molded bodies prepared from calcium silicate gels by dewatering and molding have very low strength before induration and therefore require a support during transport to the subsequent process, the unindurated molded body obtained from the abovementioned slurry has the advantage of possessing shaperetaining strength even when subjected to an appreciable impact. Thus the latter is conveyable as directly placed, for example, on a belt conveyor.

Press filtration has been found advantageous for the removal of water necessary for the formation of calcium silicate shaped product from the slurry of calcium silicate crystals. One of the advantages is that this method yields a shaped product having higher mechanical strength relative to its bulk density. With the abovementioned slurry, the water among the agglomerates is readily removable, whereas the outer shells of the agglomerates which are resistant to filtration interfere with the removal of water from the interior of the agglomerates. Accordingly when such slurry is press-filtered, the agglomerates act against removal of water from the interior thereof with an internal pressure counteracting the pressure of filtration, with the result that the agglomerates cohere with one another very closely, thereby forming a shaped product of high mechanical strength. Since the agglomerates still remain void or loose in their interior, the product has a lower bulk density. The advantages further include, for example, easy procedure, high dewatering efficiency and the ease with which shaped products of varying thicknesses and bulk densities are obtainable when so desired by suitably varying the amount of slurry used.

However, if the mold does not permit efficient drainage of the slurry during molding, the pressure builds up within the mold and causes the slurry to leak out from the mold. The bulk density of the finished product will then be lower than the predetermined value, or the bulk density will vary from portion to portion.

Moreover, it is noted that the agglomerates of crystals in the slurry contain in the internal voids thereof water which is not readily removable due to the presence of the outer shell acting against filtration. Because the water resists filtration with an internal pressure counteracting the pressure of filtration, the molding operation requires a high pressure. Especially large and high-strength boards require an extremely high pressure for molding.

The internal resistance remains in the form of strain within the molded mass, acting to expand the mass and thereby causing damage thereto when it is released from the mold.

An object of this invention is to overcome these problems and to provide an apparatus which is simple in construction and easy to operate and which is capable of forming shaped products from a slurry of calcium silicate crystals by press filtration.

Another object of this invention is to provide a molding apparatus for forming a shaped product from a slurry of calcium silicate crystals by press filtration, the apparatus being capable of releasing the shaped product from the mold in shape and sending out the product by a simple procedure.

Another object of this invention is to provide a molding apparatus for forming high-quality shaped products from a slurry of calcium silicate crystals by press filtration.

Still another object of this invention is to provide an apparatus which is advantageous in molding a slurry of calcium silicate crystals into shaped products of a large size and high strength.

Another object of this invention is to provide a molding apparatus equipped with a feeder for charging a specified large volume of slurry of calcium silicate crystals at a high speed.

These and other objects of this invention will become more apparent from the following description.

The present invention provides an apparatus for molding a slurry of calcium silicate crystals comprising:
 a base plate provided with drain passages on the upper surface,
 a net conveyor having meshes for dewatering the slurry and disposed on the upper surface of the base plate in contact therewith,
 a frame-shaped lower mold placed on the net conveyor and immediately above the base plate,
 an upper mold provided on the lower surface thereof with dewatering means for dewatering the slurry and movable into the lower mold to press and dewater the slurry in cooperation with the lower mold and to thereby form a shaped product,
 drive means for raising and lowering the lower mold, drive means for raising and lowering the upper mold, and lower mold holders movable with the upper mold and also movable upward and downward independently of the upper mold.

The slurry may contain at least one of various additives which are generally used for the preparation of calcium silicate shaped products, such as reinforcing materials, fillers and coloring agents. Examples of useful reinforcing materials are asbestos, rock wool, glass fiber, carbon fiber and like inorganic fibers, nylon, acrylic, polypropylene, polyester, pulp and cotton fibers and like organic fibers, cement, gypsum, clay, synthetic resin, etc. With use of such additives, shaped products of various properties are available. Useful fillers include pearlite, vermiculite, etc. Examples of coloring agents are indigo, alizarin yellow and like dyes, sky blue, red oxide of iron, ferrite yellow and like pigments, etc. The total amount of such additive or additives to be incorporated into the slurry is variable within a wide range but is generally 1 to 400 parts by weight, preferably 3 to 100 parts by weight, per 100 parts by weight of solids of the slurry.

With the slurry of calcium silicate crystals usable in this invention, the ratio of water to total solids including the solids of the additive if the additive is used is not particularly limited insofar as it is in the form of a slurry. However, the weight ratio of water to total solids is usually 5 to 40 parts, preferably about 7 to 25 parts of water, per part of total solids.

In accordance with this invention, the slurry of calcium silicate crystals is charged into a frame-like lower mold placed on a net conveyor and immediately above a base plate, and is pressed and filtered by an upper mold advanced into the lower mold by the dirve means of the upper mold. The water of the slurry is forced out, by the advancing upper mold, through the meshes of the net conveyor and drain passages on the base plate, and also through dewatering means on the lower surface of the upper mold. The removal of water takes place first between the agglomerates and, as the pressure builds up, the water in the voids of the agglomerats is removed. In this way, the slurry is pressed and dewatered by the coacting upper and lower molds, whereby the agglomerates are pressed against one another with the beard-like projections on the surfaces entangled to give a lightweight high-strength shaped product of calcium silicate having the form defined by the molds. The upper mold may preferably be provided on its lower surface with a wire net for filtration.

For the molding operation, a further reinforcing material such as wire net, steel reinforcement or the like may be placed at a suitable position within the lower mold so as to obtain a shaped product of improved strength.

With the present invention, therefore, water is rapidly removable from the pressed slurry, since the water can be discharged through both upper and lower molds. The upper mold is equipppded with holders for pressing down the lower mold into intimate contact with the net conveyor during filtration to thereby prevent the slurry from leaking out from between the lower mold and the net conveyor. This has the following significance.

If some of the slurry leaks out from the mold during press filtration, the resulting deficiency will give rise to irregularities in the bulk density and mechanical strength of the shaped product, making it impossible to obtain a shaped product having the predetermined bulk density and mechanical strength. When taking place after the molding process has proceeded to a certain extent, leakage of slurry will create a void in the portion of the shaped mass concerned. If such leakage occurs at a portion of the shaped mass close to its upper or lower surface, the portion will not be subjected to the molding pressure and remain defective when the product is released from the mold. This invention has overcome these problems because no leakage of slurry takes place as described above, with the result that shaped products of uniform quality can be formed advantageously from the slurry by press filtration.

Although molding pressure to be applied in accordance with this invention varies with the concentration of slurry, the size of the agglomerates therein, the type and amount of additive used, the thickness and bulk density of the product to be formed, molding speed, etc, the pressure is generally in the range of 5 to 250 kg/cm². For example, a molding pressure of as high as about 100 kg/cm² may be required for molding a slurry of calcium silicate crystals into a large-sized high-strength board measuring 1 m × 3 m × 5 cm (thickness) and having a bulk density of 0.4. g/cm³. In order to make the lower mold withstand such high pressure, the stationary base of the molding apparatus may be formed in its upper surface with a recess in which the lower end of the lower mold is fitted, with spacers interposed between the mold and the side walls defining the recess. The spacers are fixed to the upper edges of the side walls. The lower mold is slidable on the surfaces of the spacers in contact with the mold.

The apparatus of this invention is equipped with a cleaner for cleaning the upper mold, or the upper mold and net conveyor or base plate to thereby enhance the advantage of eliminating leakage of slurry from the mold during filtration. When the dewatering means of the upper mold and the net conveyor substantially serving as the dewatering means for the lower mold are clogged up, the cleaner washes them to render the upper and lower molds always fully serviceable for the removal of water, thus obviating the objection that the slurry will leak out during press filtration from the clearance between the upper and lower molds due to the clogging of the dewatering means and further eliminating the possible damage to the portion where the upper wire net is fixed when the filtration pressure builds up to excess due to the clogging. Needless to say, the cleaner effects a sufficient cleaning operation even when provided only for the upper mold, because the wash liquor (usually water) applied to the upper mold flows down from the mold over the lower mold and then over the net conveyor and the underlying base plate.

The slurry can be charged into the lower mold by a suitable method. Advantageously according to this invention, the slurry is charged, in a predetermined amount, to the lower mold by a feeder equipped with an intake and discharge change-over valve. The valve includes a rotor having a passageway with an arcuate axis. With the use of the feeder, the slurry can be charged to the mold always in a predetermined amount at a time over a very long period of time or nearly permanently. Moreover, the feeder ensures the feeding operation without breaking the agglomerates of calcium silicate crystals. My research has revealed that the change-over valve can be smoothly switched over from intake position to discharge position and vice versa for the intake of the slurry into the feeder and the discharge of the same therefrom, without permitting deposition of the agglomerates in the valve port. I have further found that the valve is reliably operable even when used repeatedly a very large number of times for the batchwise supply of the slurry in a specified amount each time.

The preferred feeder to be used in this invention comprises the combination of a cylindrical piston pump and the change-over valve. The combination assures very rapid charging of a large volume of slurry into the mold, for example at a rate of 1,000 to 2,000 liters of slurry per several seconds. When used in large quantities, the slurry must be charged at a time within a short period of time; otherwise irregularities would result in the charge, leading to unevenness in the quality of the product obtained. With this invention, such problem has been advantageously overcome by the combination of the change-over valve and cylindrical piston pump which is capable of charging a large volume of the slurry at a high speed. The feeder almost retains such outstanding performance of handling a large specified amount of charge even when the slurry incorporates a fibrous material such as given above. Moreover, since the charging operation is effected very smoothly, the agglomerates remain free of breakage.

If the feeder is equipped with some valve other than the change-over valve of this invention described, it entails the drawback that agglomerates of calcium silicate will lodge in the port when it is switched over between the intake position and the discharge position. This leads to progressive accumulation of other like agglomerates on the lodging agglomerates, with the result that the feeder becomes no longer accurately operable within a very short period of time. Although the reason has yet to be fully clarified, this phenomenon is presumbably attributable to the numerous beard-like projections on the outer surfaces of agglomerates by which the agglomerates are captured by one another. The above drawback becomes more serious when the slurry contains a fibrous material. Furthermore, valves other than the change-over valve of this invention involve vigoruos turbulence in the passageway by which the agglomerates are subjected to intensive abrasion and shearing forces and broken down. This tendency becomes more pronounced when the slurry contains a fibrous material added thereto.

When the slurry incorporates a fibrous material, the fiber length of such material may be up to $\frac{1}{4}$, preferably about $\frac{1}{8}$ to 1/10, the diameter of the passageway of the change-over valve.

To release the shaped product from the frameshaped lower mold according to this invention, the lower mold and upper mold are first raised simultaneously at the same speed. This movement releases the product from the underlying net conveyor, while permitting the product to remain in the mold. The internal pressure remaining in the product and attributable to the agglomerates will be dissipated from the exposed lower surface of the product, allowing the product to slightly expand toward the lower surface.

If the upper mold only is raised to release the product from the molds, while retaining the lower mold in its stopped position, the vacuum created between the upper mold and the product before the upper mold is completely raised out of the lower mold may possibly break the product if it has a small thickness. Conversely, if the upper mold is held in position and the lower mold only is raised, the residual internal pressure within the product will concentrate on the exposed bottom of the product at the lower end of the lower mold upon the initiation of rise of the lower mold, consequently damaging the lower end periphery of the product.

With this invention, these problems can be eliminated by raising the lower and upper molds simultaneously at the same speed.

In order to raise the lower and upper molds together, the apparatus of this invention includes lower mold holders which are movable with the upper mold. By raising the lower mold while it is being held by the holders, the lower mold, holders and upper mold can be effectively raised simultaneously at the same speed. It is sufficient to elevate them such a distance as to release the bottom of the shaped product from the net conveyor. Generally the distance is about 10 to 30 mm.

According to this invention, the drive means for the lower mold, upper mold and holders may be of any of the electric, mechanical and fluid control types, among which the fluid control type, especially one employing a noncompressive fluid, is preferable. Such drive means always assure simultaneous rise of the upper and lower molds at the same speed.

The shaped product is released from the lower mold by the upward movement of the lower mold relative to the upper mold. During this movement, the entire product is forced out from the lower mold by being pushed with the upper mold. The product therafter releases itself from the upper mold under gravity, fallig onto the underlying net conveyor. The prouct can be made more readily releasable from the upper mold if compressed air is applied to the product through the dewatering means on the mold. The conveyor is driven to send out the product from the apparatus.

Since the shaped product has the strength inherent to the slurry of the type described which strength is imparted only by press filter molding, the product retains its shape free of any damage when falling onto the conveyor or during the conveyance. Thus this invention saves the labor which would otherwise be needed to place shaped products on a support one by one to convey them to the subsequent process. The invention therfore simplifies the construction and operation of the apparatus.

When desired, the charge of slurry to the mold can be suitably selectively determined to form shaped products of varying thicknesses and apparent specific gravities.

This invention will be described below with reference to the accompanying drawings showing embodiments of the invention.

Figure 1:
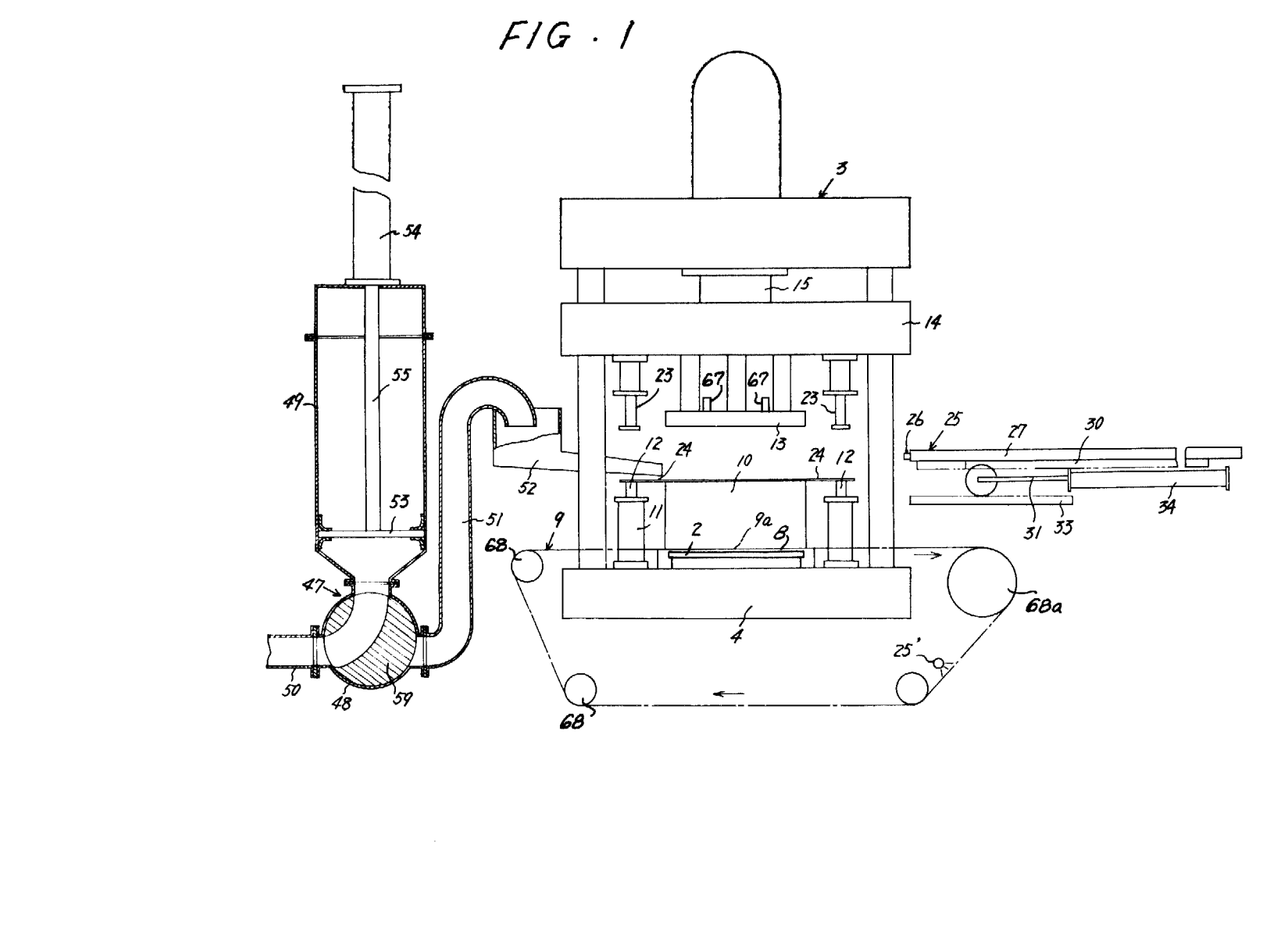
FIG. 1 is a side elevation partly in vertical section and schematically showing a preferred embodiment of this invention.
Figures 2, 4, 5:
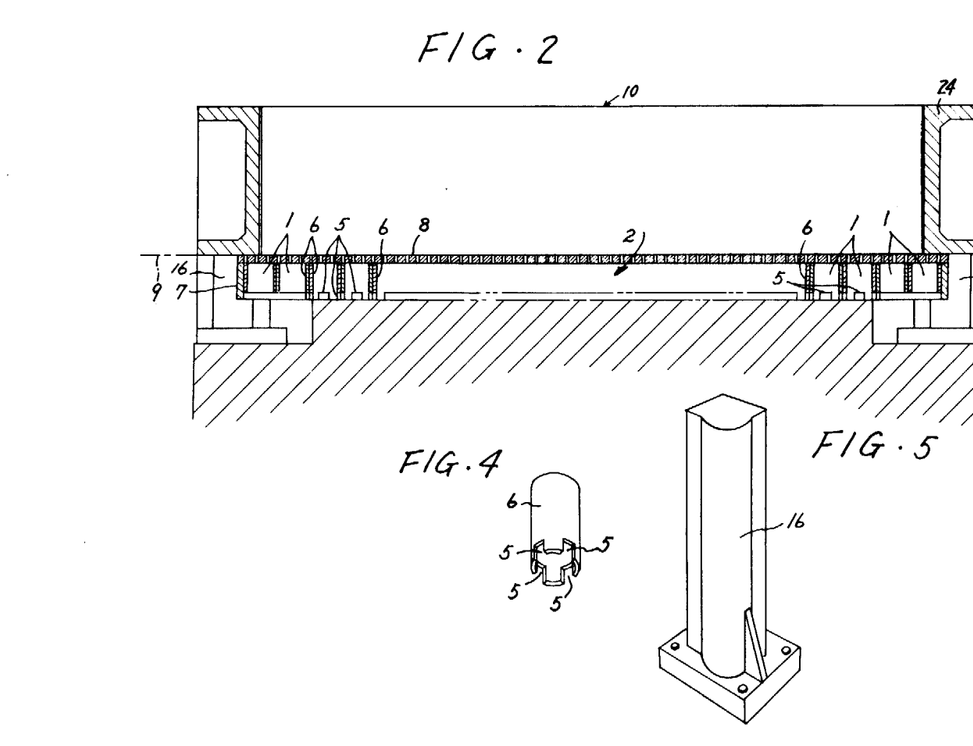
FIG. 2 is an enlarged side elevation in vertical section showing a lower mold and a base plate included in the embodiment.
FIG. 4 is a perspective view showing a tube forming a drain passage on the base plate as the tube is seen from therebelow.
FIG. 5 is an enlarged perspective view showing a guide post for guiding the upward and downward movement of lower mold of the embodiment.

Referring to FIG. 1, a base plate 2 provided with drain passages 1(see FIG. 2) thereon is mounted on the stationary base 4 of a press 3 (see FIG. 1). In the illustrated embodiment best seen in FIG. 2, the drain passages 1 on the base plate 2 are formed by a large number of short upright tubes 6 which are bundled together as closely arranged in vertical and horizontal rows on the same plane so as to withstand a high pressure. Each of the tubes 6 has cutouts 5 at its lower end to permit effective drainage (see FIGS. 2 and 4). The drain passages 1 may of course have some other suitable construction. The assembly of tubes 6 may be surrounded by an outer frame 7 to impart sufficient strength to the assembly and to render the tubes easy to bundle. A dewatering layer 8 in the form of a perforated plate, reticular plate or the like can be fixedly or removably attached to the top of the tubes 6 to permit a slurry of calcium silicate crystals to be effectively dewatered by press filtration and also to prevent the below-mentioned net conveyor 9 from deformation under pressure.

The upper side 9a of the endless net conveyor 9 (see FIG. 1) extends over the base plate 2 in contact therewith, and a frame-shaped lower mold 10 is positioned on the upper side 9a. The conveyor 9 is of course tensioned by suitable means for example by tension rolls 68, at least one (68a) of which is positively driven to drive the conveyor 9. The net conveyor 9 has meshes suitable for dewatering the calcium silicate crystal slurry. The apertures measure usually 0.15 mm to 1.0 mm, preferably 0.25 mm to 0.6 mm. The net conveyor 9 has a width sufficient to close the bottom opening of the frame-shaped lower mold 10 and thus serves substantially as a dewatering layer for the lower mold 10.

Figure 3:
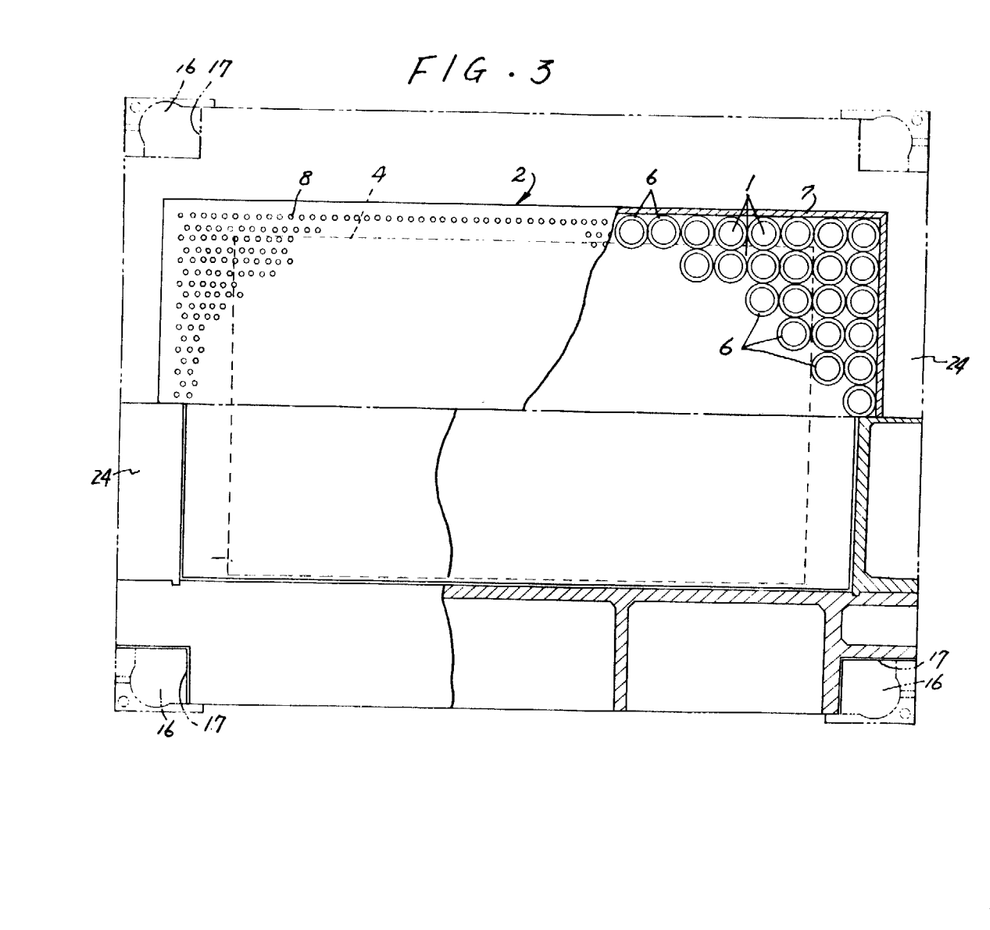
FIG. 3 is a plan view partly broken away to show the lower mold.

The lower mold 10 is fixed to the upper ends of plungers 12 of upright hydraulic cylinders 11 mounted on the stationary base 4 of the press 3 (see FIG. 1) and is movable upward and downward by the plungers 12. The lower mold 10 has grooved portions 17 (see FIG. 3) slidable on guide posts 16 (see FIG. 5) extending upward from the stationary base 4 and is thereby guided for vertical movement.

Figure 14:
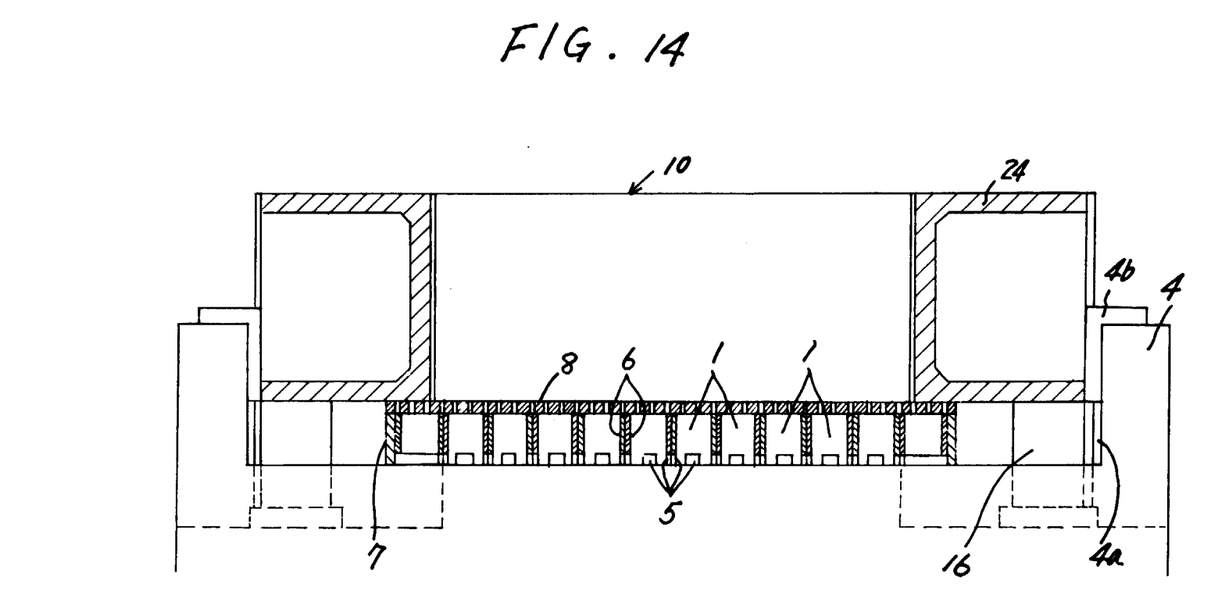
FIG. 14 is an enlarged side elevation in vertical section showing a lower mold and a base plate included in another embodiment.
Figure 15:
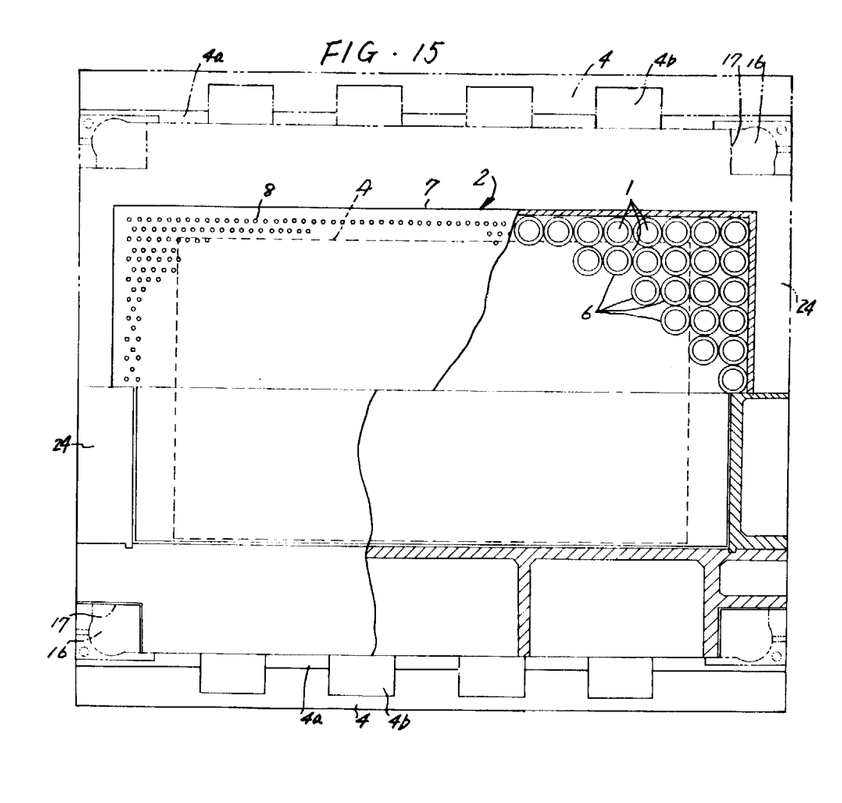
FIG. 15 is a plan view of FIG. 14.

The lower mold 10 may be positioned on the flat upper surface of the stationary base 4 as shown in FIG. 1 or may be so positioned as shown in FIGS. 14 and 15 with its lower end fitted in a recess 4a in the top of the stationary base 4. In the latter case, spaces 4b are interposed between the lower end of the lower mold 10 and the inner edges of the base 4 which define the recess 4a. The spacers 4b are arranged at an appropriate spacing and also serve to guide the lower mold 10. The latter embodiment shows specific means for reinforcing the lower mold 10 against lateral pressure.

Figure 6:
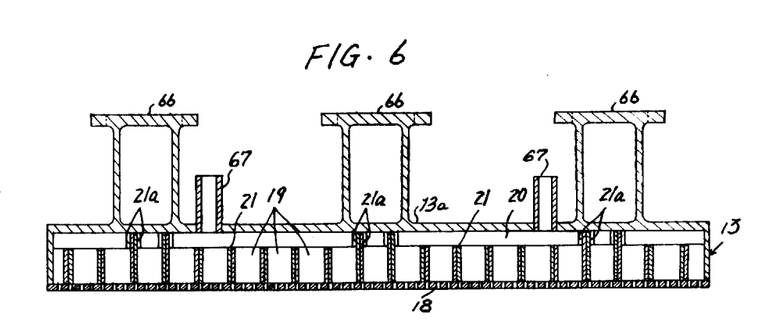
FIG. 6 is an enlarged side elevation in vertical section showing the upper mold.
Figure 7:
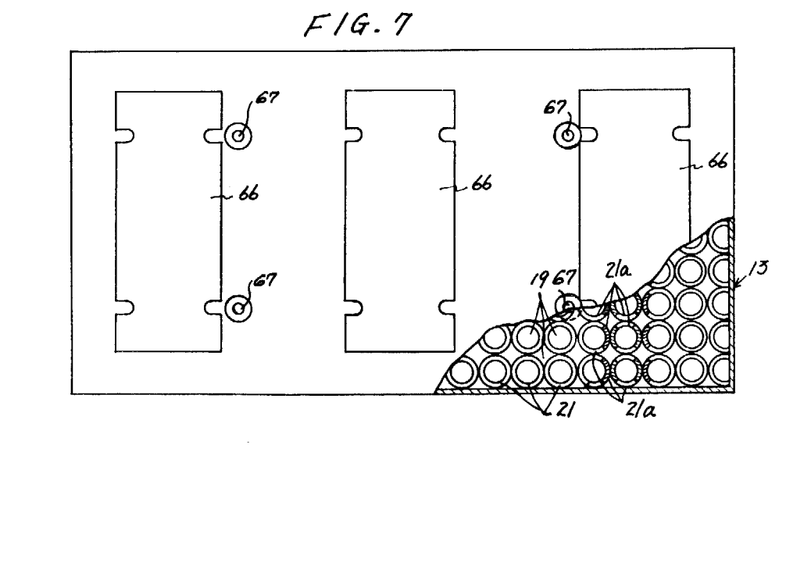
FIG. 7 is a plan view partly broken away to show the upper mold.
Figure 8:
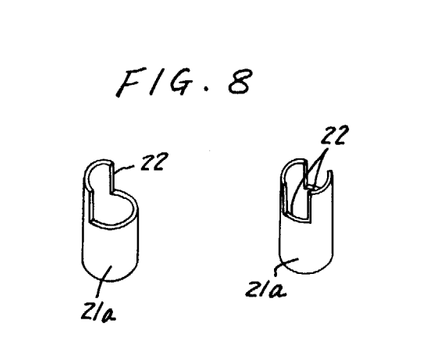
FIG. 8 is a perspective view showing tubes constituting drain passages in the upper mold.

Disposed above and opposed to the lower mold 10 is an upper mold 13 having flanges 66 (see FIG. 6) secured to the movable support 14 of the press 3. The upper mold 13 is movable upward and downward with the support 14 by the shank 15 of the press 3. The upper mold 13 is provided on its bottom with a dewatering layer 18 (see FIG. 6) to remove water from the slurry. The dewatering layer 18 may have the same construction as the dewatering layer 8 already described. A removable wire net (not shown) can be provided over the lower surface of the dewatering layer 18. Drain passages 19 are formed on the upper side of dewatering layer 18 of the upper mold 13 (FIG. 6). In this case, the interior of the tubes 21 and the spaces between the adjacent tubes 21 serve as the passages 19. (See FIG. 7.) The drain passages 19 are formed by a large number of short tubes 21 which are bundled together as arranged in horizontal and vertical rows on the same plane. The drain passages 19 may of of course have some other suitable construction. By way of an upper space 20 formed in the upper mold 13, the drain passages 19 communicate with a drain pipes 67 extending outward from the mold 13 (see FIGS. 6 and 7). The water removed during the molding operation flows through the dewatering layer 18, then through the passages 19, thereafter through the space 20 communicating with the passages 19 and finally to the drain pipes 67, from which the water overflows outside the mold 13. In order to reinforce the dewatering layer 18 on the bottom of the upper mold 13, at least some of the tubes 21 may preferably have a length equal to the distance between the upper surface of the dewatering layer 18 and the lower surface of top plate 13a of the upper mold 13. The tube having such length is designated at 21a and shown in FIGS. 6 to 8. The tube 21a has a cutout 22 so as to permit free flow of water within the space 20.

Holders 23 (see FIG. 1) for downwardly pressing the lower mold 10 are disposed above flanges 24 at the upper end of the mold 10 and mounted on the bottom of movable support 14 of the press 3. The holder 23 may be of an appropriate type such as a hydraulic one.

Figure 9:
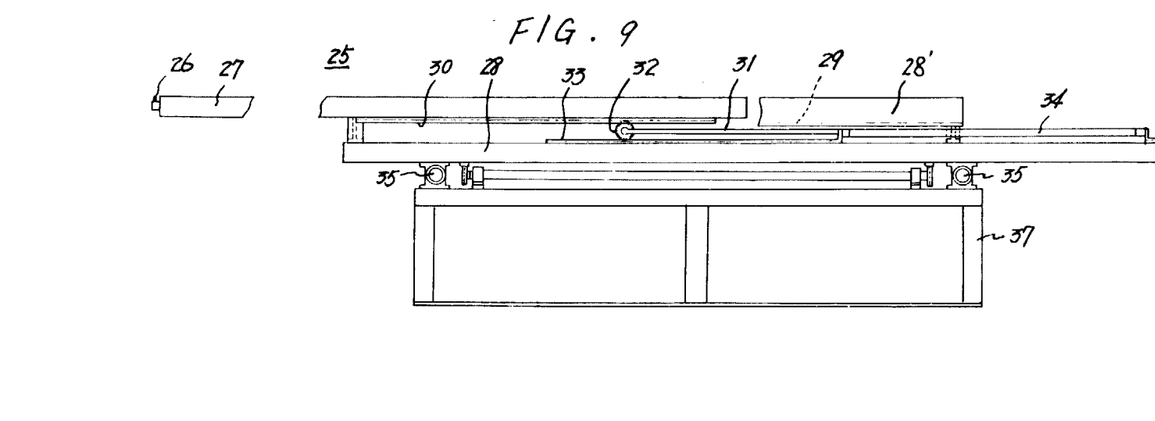
FIG. 9 is a side elevation showing in a detail a perferred example of a cleaner included in the embodiment.
Figure 10:
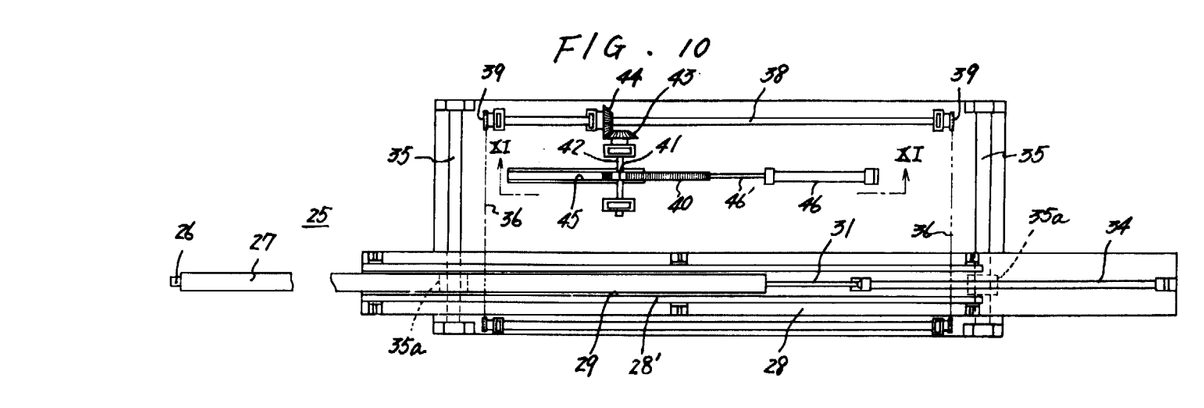
FIG. 10 is a plan view of the same.

With reference to FIGS. 1, 9 and 10, a cleaner 25 has a nozzle 26 mounted on one end of a rod 27 and directed upward. The nozzle 26 is connected to an unillustrated duct for supplying high-pressure water. Furthermore, the net conveyor 9 may be provided with a cleaner when so desired. The cleaner for the net conveyor is indicated at 25' in FIG. 1. For this purpose, a cleaner of the stationary type is fully serviceable.

Figure 11:
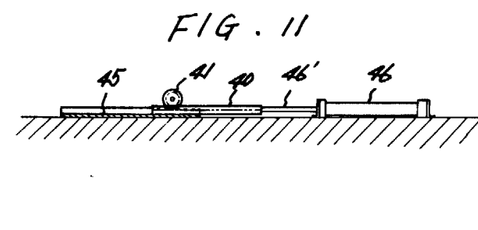
FIG. 11 is a view in section taken along the line XI—XI in FIG. 10.

The rod 27 of the cleaner 25 is slidably fitted in a guide groove 29 formed in an upper support 28'. The rod 27 is provided on its lower surface with a rack 30 meshing with a pinion 32 supported on the end of a hydraulic ram 31 disposed in parallel to the longitudinal direction of the groove 29. The pinion 32 is also in meshing engagement with a rack 33 on a lower support 28. The hydraulic cylinder for the ram 31 is indicated at 34. The lower support 28 has slide shoes 35a fitting to guide bars 35 arranged at right angles to the ram 31 and mounted on a frame 37. The lower support 28 is fixed to an upper side portion of each of endless chains 36 extending in parallel to the guide bars 35. The endless chains 36 are driven by sprocket wheels 39 at the opposite ends of a spindle 38 which is rotatable by a hydraulic ram 46' (see FIGS. 10 and 11). The power is transmitted from the ram 46' to the spindle 38 by way of a rack 40 fitting in a guide groove 45 and connected to the end of the ram 46', a pinion 41 meshing with the rack 40, a pinion shaft 42, a bevel gear 43 at one end of the shaft 42, and a bevel gear 44 mounted on the spindle 38 and meshing with the bevel gear 43. The hydraulic cylinder for the ram 46' is indicated at 46.

Figure 12:
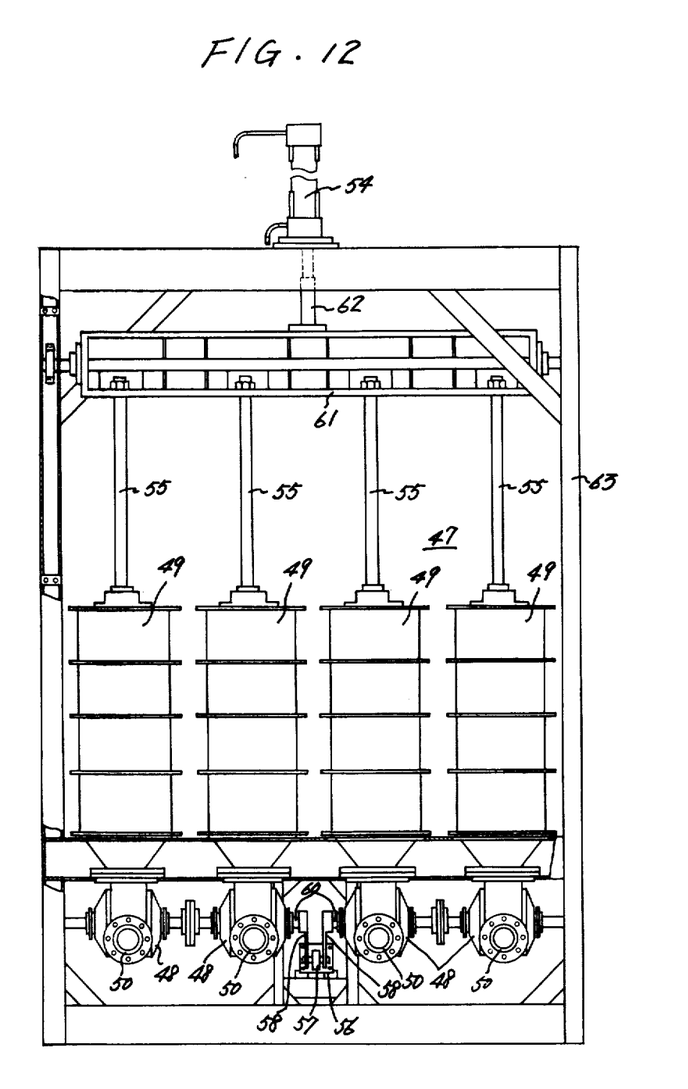
FIG. 12 is a front view showing in detail a slurry feeder included in the embodiment.
Figure 13:
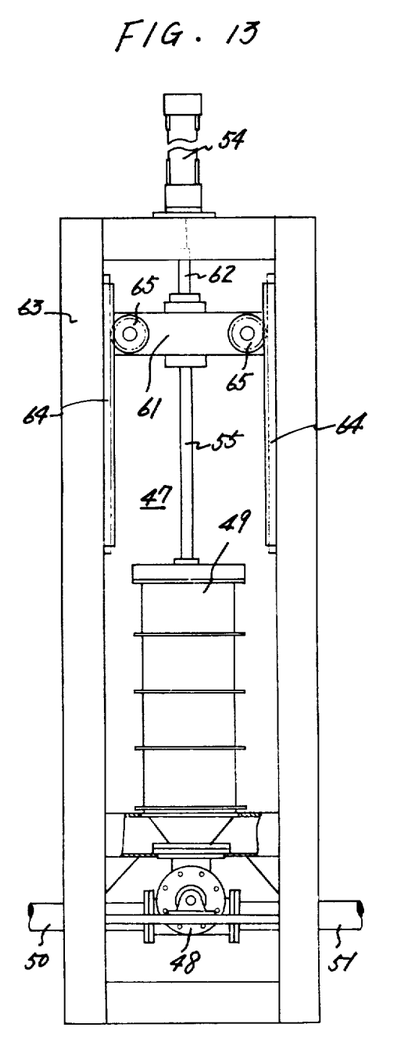
FIG. 13 is a side elevation of the same.

FIGS. 1, 12 and 13 show a feeder 47 for feeding a specified amount of slurry of calcium silicate crystals including a piston pump 49 equipped with a change-over valve 48. The change-over valve 48 is switched over to the discharge position by operating the plunger 57 of a hydraulic cylinder 56 to cause levers 58 to turn the rotatable stems 60 of cocks 59 of the valves 48. The valve 48 has a rotor formed with an arcuate passageway. The valve 48 is connected to an intake duct 50 which is connected to an unillustrated tank containing the slurry. The valve 48 has a discharge duct 51 the open end of which extends into a trough 52. The trough 52 extends to the top opening of the frameshaped lower mold 10, with the front end disposed on the top of the lower mold 10. The trough 52 is pivotally supported at its rear end portion by unillustrated means, such that it will be raised pivotally upward when the lower mold rises. The pump 49 includes a piston 53 reciprocally movable by a rod 55 to be driven by a hydraulic cylinder 54, pneumatic cylinder or like suitable drive means. The pump 49 has such capacity that a plurality of like pumps employed in combination will supply the amount of slurry required to mold one mass of shaped calcium silicate crystals. This is more advantageous than when the required amount of slurry is fed by a single pump. By suitably selecting the number of the pumps 49 to be operated, the supply of slurry will then be optionally adjustable to obtain shaped products of varying bulk densities with use of the combination of the same molds 10 and 13. This further serves to eliminate irregularities in the concentration of the slurry within the mold 10 and to thereby obviate irregularities in the bulk density of the resulting product. When a plurality of pumps 49 are employed, it is preferable to connect the piston rods 55 of the pumps 49 to a vertically movable support 61 so as to ensure that the pumps will operate in unison for intake and discharge of the slurry (see FIGS. 12 and 13). The support 61 is connected to the plunger 62 of a hydraulic cylinder 54. The support 61 has pinions 65 meshing with vertical racks 64 fixed to a frame 63 and is thereby made smoothly movable upward and downward.

The illustrated apparatus of this invention will operate in the following manner.

The pistons 53 of pumps 49 of the feeder 47 are retracted (i.e. raised in FIG. 1) with the valves 48 in the intake position to withdraw the slurry of calcium silicate crystals from the tank into the pumps 49 via the ducts 50. The intake of slurry into the pumps 49 is determined by the preset stroke of the plunger 62 of the hydraulic cylinder 54, i.e. by the backward displacement of the pistons 53.

When the predetermined amount of slurry has been completely taken in, the change-over valves 48 are switched over to the discharge position by operating the plunger 57 of a hydraulic cylinder 56 to cause levers 58 to turn the rotatable stems 60 of cocks 59 of the valves 48. Unlike brake motors which are liable to stop at different positions owing to inertia, the hydraulic cylinder 56 is accurately operable to ensure accurate feeding operation.

Subsequently, the pistons 53 advance (i.e. descend in FIG. 1) to force out the slurry from the pumps 49 into the lower mold 10 through the valves 48, ducts 51 and troughs 52. In this way, the predetermined amount of slurry is charged into the lower mold 10. During charging, the upper mold 13 is held in its raised position.

The slurry in the lower mold 10 is pressed and dewatered by the upper mold 13 forced into the lower mold 10. At an appropriate time before the slurry is pressed on for dewatering, the lower mold 10 is downwardly pressed at its flanges 24 by the holders 23. Accordingly, water can be removed effectively without permitting the slurry to leak out from a space which would otherwise be formed between the upper side 9a of the net conveyor 9 and the lower mold 10 placed thereon. The slurry is therefore moldable into the desired shaped product.

The water resulting from the dewatering operation and flowing through the drain passages 19 of the upper mold 13 passes through the space 20 of the upper mold 13 and drain pipe 67 and is run off from the mold. On the other hand, the water separated from the slurry by the dewatering layer of the lower mold 10, namely by the upper side of the net conveyor 9 flows out through the apertures of the layer 8 and drain passages 1.

Thus the calcium silicate crystals are molded by the lower and upper molds 10, 13 to the shape defined by the molds. Upon completion of the molding operation, the lower and upper molds 10, 13 are simultaneously raised at the same speed to a predetermined level, for example by about 20 mm. This upward movement can be effected by raising the lower mold 10 while it is being held by the houlders 23. Of course during this movement, the drive system for the shank 15 of the movable support 14 of the press 3 is left out of operation, permitting the upper mold and the support 14 to rise with the ascending lower mold. The shaped mass of calcium silicate crystals in the lower mold 10 is released from the net conveyor and brought upward along with the lower and upper molds 10, 13 which are raised at the same time at the same speed.

Upon the molds 10, 13 reaching a specified position, the upper mold 13 is held at that position and the holders 23 are retracted, while permitting the lower mold 1o alone to rise further upward. Consequently, the rise of the lower mold 10 relative to the upper mold 13 forces out the shaped mass from the bottom opening of the lower mold 10, whereupon the shaped mass separates from the upper mold 13 under gravity, falls onto the net conveyor 9 and is thereby received. The net conveyor 9 is driven to send out the shaped product from the molding apparatus. While in operation, the net conveyor 9 is washed with the water forced out from the cleaner 25'.

After the above procedure has been completed, the lower and upper molds 10, 13 are returned to the original position for the next cycle of molding operation. The change-over valves 48 are switched over to the intake position.

When the dewatering layer 18 on the upper mold 13 is clogged up, the ram 31 is driven to cause the rod 27 to bring the nozzle 26 to a position below the dewatering layer 18. High-pressure water is then sprayed onto the dewatering layer 18 from the nozzle for cleaning. The nozzle 26 is forwardly and backwardly movable by the ram 31, and the upper support 28' carrying the rod 27 for the nozzle 26 is movable by the reversible rotation of the spindle 38 in directions at right angles to the direction of forward and backward movement of the nozzle 26. The dewatering layer 18 can therefore be cleaned over the entire surface thereof. Because the water applied to the dewatering layer 18 from the nozzle 26 flows down from the layer 18 over the lower mold 10 and the upper side 9a of the conveyor, the water also serves to clean the mold and the conveyor. Being thus washable, the dewatering layers 18, 8 and 9a always act effectively for the removal of water.

The entire lower surface of the upper mold can be cleaned effectively by employing a number of nozzles 26 which are transversely arranged over a distance corresponding to the width of the lower surface. When the dewatering layers on the upper and lower molds become markedly clogged up, the filtering pressure increases beyond the specified value, reducing the molding efficiency and causing damage to the dewatering layers, especially to the lowermost wire net on the upper mold which net is usually fastened to the mold by bolts. Experiments conducted on the wire net, 1 m × 3 m, on the upper mold show that when it was used for continuous molding operation without cleaning with water, the molding efficiency decreased by 20 to 40% in 4 days to one week and the wire was broken, whereas when the wire net was washed with water every six hours, the net was found free of any deformation or damage even in one month, without entailing any reduction in the molding efficiency.

While several embodiments of this invention have been described hereinabove, other changes and modifications may be made by those skilled in the art without departing from the inventive spirit and scope as defined in the appended claims.

I claim:

1. An apparatus for molding a slurry of calcium silicate crystals comprising:
   a base plate provided with drain passages on the upper surface,
   a net conveyor having meshes for dewatering the slurry and disposed on the upper surface of the base plate in contact therewith, said conveyor being movable from the upper surface of the base plate to enable discharge of the shaped product after the molding operation is completed,
   a frame-shaped lower mold movable between a position wherein said mold is disposed on said net conveyor immediately above said base plate, and a position above said net conveyor,
   an upper mold provided on the lower surface thereof with dewatering means for dewatering the slurry, located above and movable into engagement with the lower mold to press and dewater the slurry in cooperation with the lower mold and to thereby form a shaped product,
   first drive means operatively associated with said lower mold for lowering said lower mold onto the net conveyor immediately above said base plate and for raising said lower mold relative to said net conveyor,
   second drive means operatively associated with said upper mold for lowering said upper mold into contact with said lower mold and for raising said upper mold, and
   lower mold holder means operatively associated with said lower mold for pressing said lower mold downwardly during the molding operation independently of the movement of said upper mold and for holding said lower mold so that said upper and lower molds can be raised together by said first drive means, said lower mold holder means allowing relative movement between said molds subsequent to their being raised together to cause the discharge of the shaped product.

2. An apparatus as defined in claim 1 which is provided with a cleaner disposed adjacent to said dewatering means of said upper mold for cleaning said dewatering means of the upper mold.

3. An apparatus as defined in claim 2 wherein a cleaner is disposed on the path of travel of the net conveyor for cleaning the meshes of the conveyor.

4. An apparatus as defined in claim 1 which is provided with a feeder disposed adjacent said lower mold for charging a predetermined amount of the slurry into said lower mold, said feeder having an intake and discharge change-over valve, the valve including a rotor having a passageway with an arcuate axis.

5. An apparatus as defined in claim 1 wherein the first and second drive means each comprise a hydraulic press.

6. An apparatus as defined in claim 1 wherein the drain passages on the base plate are formed by a large number of short tubes grouped together and arranged in rows on the same plane, each of the tubes having cutouts at the lower end thereof.

7. An apparatus as defined in claim 1 wherein the lower end of the lower mold is fitted in a recess in the upper surface of a stationary base on which said base plate is mounted, spacers being interposed between the lower end and the side walls defining the recess, the lower mold being slidable on the surfaces of the spacers in contact with its lower end.

8. An apparatus as defined in claim 4 wherein a piston pump is provided in combination with the change-over valve to constitute the feeder, said pump pumping slurry to said change-over valve.

* * * * *